United States Patent [19]

Litt et al.

[11] Patent Number: 4,778,976

[45] Date of Patent: Oct. 18, 1988

[54] WELDING NOZZLE CLEANER APPARATUS

[75] Inventors: Richard O. Litt, Davenport; Joel E. Lorentzen, Bettendorf, both of Iowa

[73] Assignee: Genesis Systems Group, Ltd., Davenport, Iowa

[21] Appl. No.: 40,035

[22] Filed: Apr. 20, 1987

[51] Int. Cl.[4] .............................................. B23K 9/00
[52] U.S. Cl. .................................. 219/136; 219/137.2; 901/42
[58] Field of Search ................ 219/136, 137.2, 137.43, 219/74; 239/104, 106; 901/42

[56] References Cited

U.S. PATENT DOCUMENTS

| 2,938,994 | 5/1960 | van der Willigen et al. | 219/137.2 X |
| 3,284,608 | 11/1966 | McDonald | 219/137.43 |
| 3,396,263 | 8/1968 | Even et al. | 219/127 |
| 3,963,895 | 6/1976 | Hennion | 219/125.1 |
| 4,280,043 | 7/1981 | Feix et al. | 219/74 X |
| 4,609,804 | 9/1986 | Kishi et al. | 219/74 |

FOREIGN PATENT DOCUMENTS

| 3339547 | 6/1985 | Fed. Rep. of Germany | 219/136 |
| 0235214 | 4/1986 | German Democratic Rep. | 219/136 |

Primary Examiner—Clifford C. Shaw
Attorney, Agent, or Firm—Henderson & Sturm

[57] ABSTRACT

Apparatus to prevent the formation of welding material about the outlet end of a welding nozzle comprising valve units activated upon contact by engagement thereby of the welding nozzle, a pneumatic system connected with the valve units, and reciprocal hammer device proximate the valve units and fluid connected to the pneumatic system, the hammer device operable by the pneumatic system upon activation of the valve units to repeatedly strike the welding nozzle, thereby dislodging any material build-up thereon. The apparatus further includes a spraying unit connected with the valve units and pneumatic system to spray an anti-welding spatter compound toward and into the outlet of the welding nozzle.

6 Claims, 2 Drawing Sheets

4,778,976

WELDING NOZZLE CLEANER APPARATUS

TECHNICAL FIELD

The present invention relates generally to welding torch cleaning by preventing the build-up thereon of welding material, and more particularly to a new and novel welding torch cleaner apparatus adapted for use with robotic welding apparatus.

BACKGROUND ART

In gas welding, it is not uncommon for small and minute pieces of metal, commonly called "spatter", to collect within and about the outlet end of a welding torch through which oxygen and acetylene gas pass to the weld pool.

In a conventional welding apparatus, the operator takes a hammer or the like and bangs it against the welding torch nozzle—of metal, in an effort to dislodge the spatter. Such weld material or spatter continues to build up, and the constant interruptions to dislodge the material seriously affect the efficiency of the welding operation.

One attempt to overcome the above problem has been the application of a coating of liquid containing silicon to the inner surface of the welding nozzle, however no effective mechanism for applying same is known. Another attempt is described in U.S. Pat. No. 2,938,994 to van der Willigen et al. In this patent, a ball is arranged to strike the welding nozzle in response to a cam-operated mechanism activated by the movement of a welding wire continually fed to the nozzle. Yet another method of cleaning the welding nozzle is to ream its interior. This latter method has the disadvantage of scoring the inside of the nozzle, which scoring permits a more aggressive adhering of the spatter to the scored interior. Also, reaming frequently catches and destroys the welding wire in the torch during the cleaning cycle, causing unacceptable intervention in automatic welding operations.

These attempts do not lend themselves to contemporary welding apparatus which is carried and directed by computer-controlled robotic equipment, and it is therefore the primary object of this invention to provide an efficient and effective welding nozzle cleaning apparatus adapted for use with robotic controlled welding apparatus.

DISCLOSURE OF THE INVENTION

The welding nozzle cleaner apparatus of this invention is designed specifically for robotic applications. The apparatus must be positioned approachably within the work envelope of the robot, but is not mounted on the robot arm, thus not constraining the payload capacity of the robot. The apparatus is actuated entirely by robot movements, thus not constraining any input/output signals of the robot control.

The nozzle cleaner performs the following functions: cleaning the spatter from the welding nozzle by "rapping" it at an adjustable frequency; and lubricating the nozzle with commercially available anti-spatter compound.

The nozzle cleaner apparatus comprises valve means activated upon contact by engagement thereby of the welding nozzle, a pneumatic system connected with the valve means, and a reciprocal hammer means proximate the valve means and fluid connected to the pneumatic system, the hammer means operably by the pneumatic system upon activation of the valve means to repeatedly strike the welding nozzle, thereby dislodging any material build-up thereon. The apparatus further includes a spraying means connected with the valve means and pneumatic system to spray an anti-welding spatter compound toward and into the outlet of the welding nozzle.

It is an object of this invention to provide a new and improved apparatus for preventing the build-up of spatter within a welding torch or nozzle.

Another object of this invention is to provide such a welding nozzle cleaning apparatus entirely activated by the welding nozzle but entirely apart therefrom.

Still another object of this invention is to provide such an apparatus capable of sequentially striking or rapping the nozzle to dislodge welding spatter therefrom and spraying the outlet end of the nozzle with an anti-spatter compound.

Yet another object of this invention is to provide such an apparatus with a pneumatic system with a syphon-type spray nozzle for receiving and delivering air under pressure combined with an anti-spatter compound, and which utilizes further an optimizing valve operable in response to a lack of siphoning air to prevent the flow of the compound to or from the spray nozzle.

BRIEF DESCRIPTION OF THE DRAWINGS

These and other objects of the invention will become readily apparent upon a thorough study and review of the following detailed description of the preferred embodiment for carrying out the invention, particularly when viewed in conjunction with the accompanying drawings, wherein.

BEST MODE FOR CARRYING OUT THE INVENTION

Figure 1:
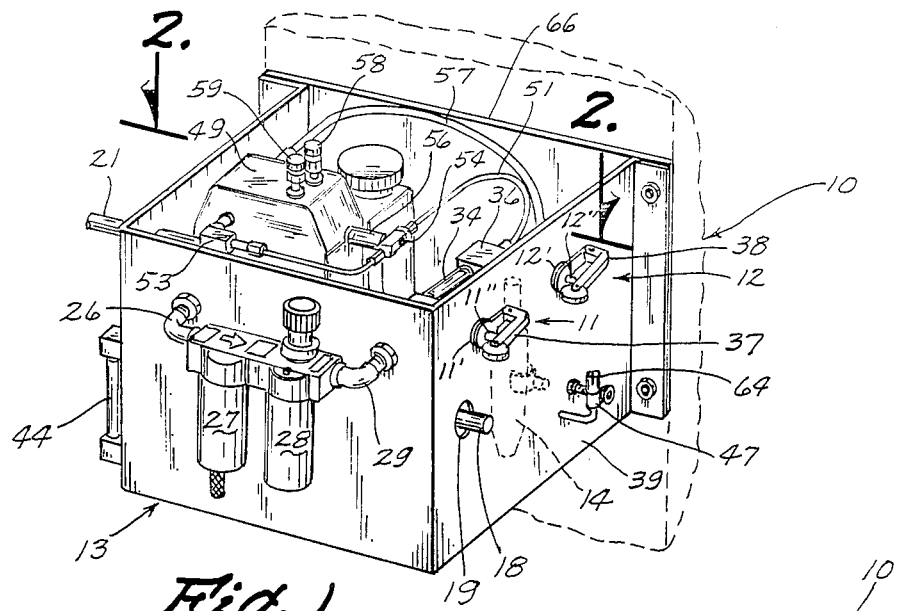
FIG. 1 is perspective view of the welding nozzle cleaner apparatus of this invention.
Figure 2:
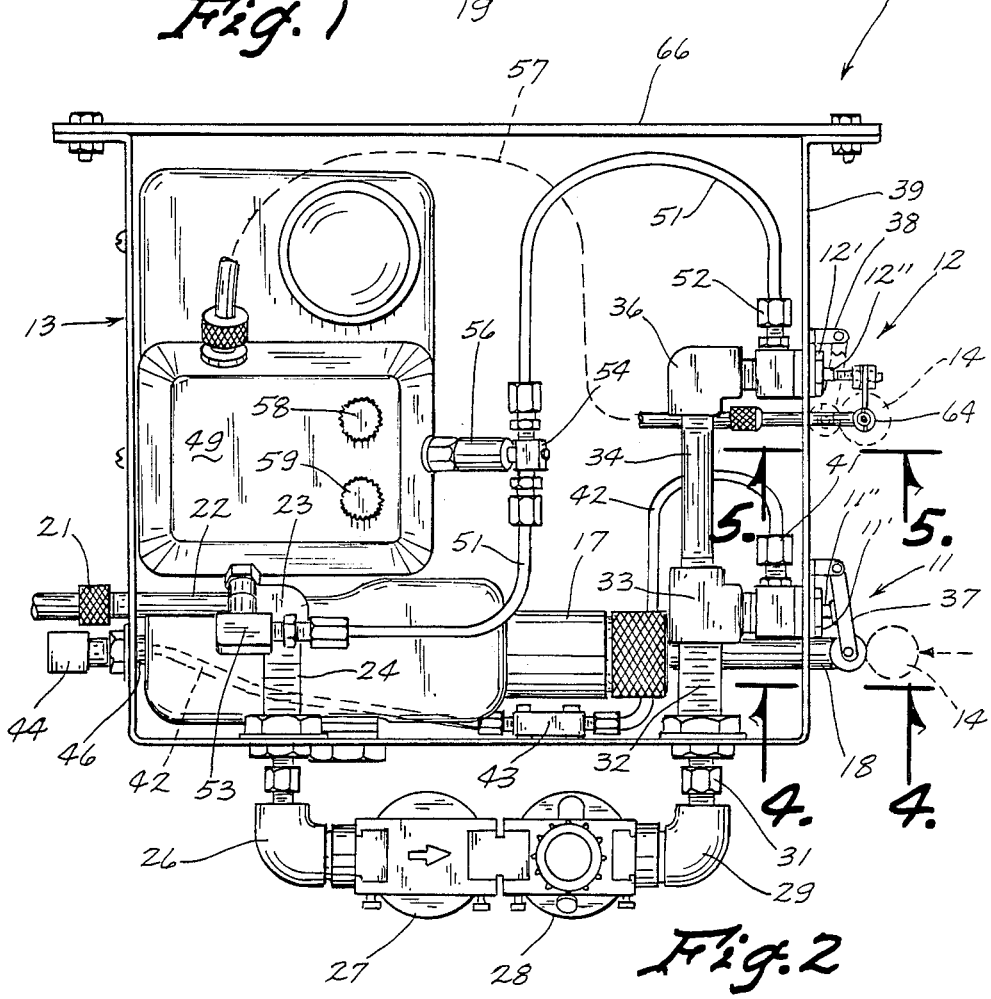
FIG. 2 is an enlarged top plan view of the apparatus of FIG. 1.
Figures 4, 5:
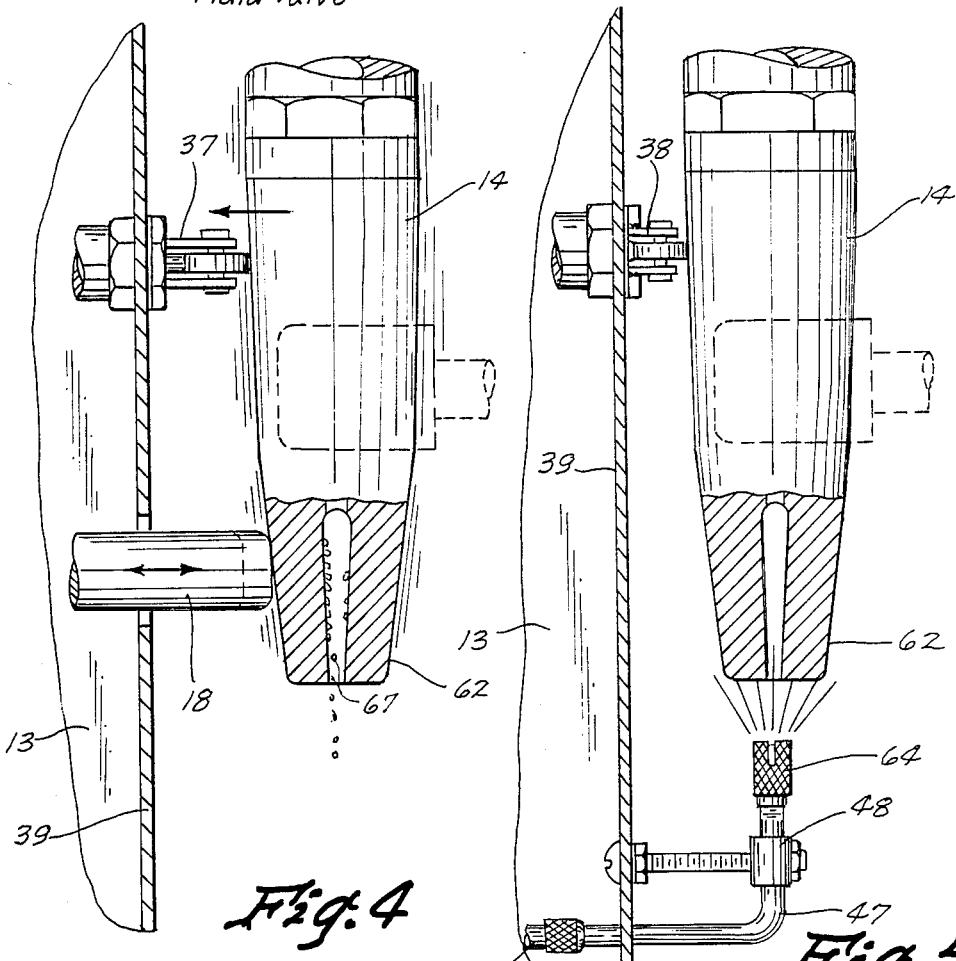
FIG. 4 is a further enlarged detail view of a welding nozzle in contact with a hammer valve of the apparatus.
FIG. 5 is a view similar to FIG. 4, and with the anti-spatter nozzle in contact with an anti-spatter compound spray nozzle valve.

Referring now to the drawings, the welding nozzle cleaner apparatus of this invention is indicated generally at (10) in FIGS. 1 and 2. The apparatus comprises generally a pair of valve units, a hammer valve unit (11) and a misting valve unit (12), mounted on a box-like housing (13), each valve unit (11),(12) activated upon contact by engagement therewith of a welding nozzle (14) (FIGS. 4 and 5). The nozzle (14) may be part of a conventional gas or arc welding apparatus (not shown) robotically controlled, such that movement of the nozzle (14) into and out of contact with either the valve units (11) or (12) may be conventionally automatically timed and controlled according to the cleaning needs of the nozzle (14).

Figure 3:
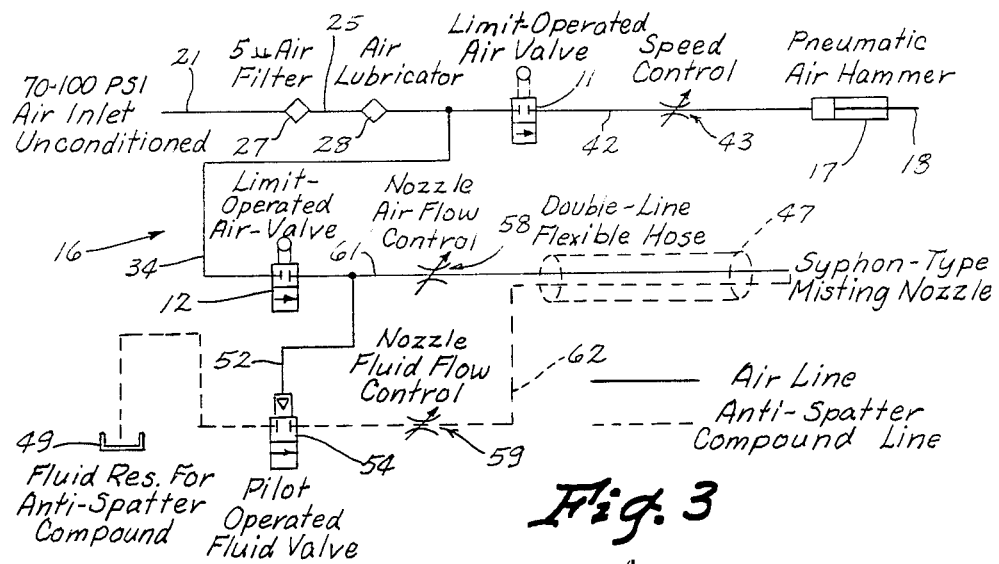
FIG. 3 is a schematic of the main operating components of the apparatus.

The welding nozzle cleaner apparatus (10) comprises further a pneumatic system indicated generally at (16) in FIG. 3 and described more in detail hereinafter, which pneumatic system has fluid connected therein the valve units (11),(12), and comprises also a reciprocal hammer device (17) (FIG. 2) proximate to the valve unit (11) and also fluid connected within the pneumatic system (16), the hammer device (17) including an elongated striker (18) extended outwardly through an opening (19) formed in the housing (13), which striker (18) is operably upon activation of the valve unit (11) by engagement thereof of the nozzle (14), to repeatedly strike the welding nozzle (14) thereby dislodging any material build-up thereon from the welding process.

More particularly, the pneumatic system (16) comprises an air inlet fitting (21) (FIG. 2) for supplying air at standard plant pressures (70–100 PSI), and connected to a pipe nipple (22), elbow (23), anchor connector (24) secured to the housing (13) and another elbow (26) transmitting the inlet air to a commercial air filter unit (27) and an adjustable air lubricator unit (28) (FIGS. 1 and 2). Referring to FIG. 3, the aforementioned piping is indicated by schematic line 25.

The air under pressure in the pneumatic system (16) is then transmitted through an elbow (29) (FIG. 2), hex nipple (31), and anchor connector (32) to a T-element (33), to which the hammer valve unit (11) is connected, and through a pipe element (34), to an elbow (36) for connection with the misting valve unit (12). Each limit-operated valve unit (11) and (12) is identical, comprising a housing (11') and (12') with a plunger (11") and (12") reciprocally mounted therein for engagement with respective cam operators (37),(38) secured to the housing side (39) as best illustrated in FIGS. 1 and 2.

The pneumatically operated hammer device (17) (FIG. 2) is fluid connected with the air under pressure by an adapter (41) at the hammer valve unit (11) leading by tubing (42) to flow or speed control valve (43), the tubing (42) leading further through U-shaped piping (44) (FIGS. 1 and 2) to the rear end (46) of the hammer device (17).

The pneumatic system (16) further includes a spraying unit which includes the misting valve unit (12) and a syphon-type spray nozzle (47) (FIGS. 2 and 3), it being noted the nozzle (47) is mounted to and extended through the housing side (39) directly below the misting valve unit (12), as by a clip device (48). Air under pressure from the air inlet (21) is supplied to an anti-spatter compound holding reservoir (49) by tubing (51) fluid connected by an adapter (52) to the misting valve unit (12) (FIG. 2) and leading to the reservoir (49) through a T-element (53), a pilot operated valve (54) being interposed in the tubing line (51) and fluid connected to the reservoir at (56). To transmit the anti-spatter compound to the spray nozzle (47), additional tubing (57) is provided, as partially shown in dotted line in FIG. 2.

A pair of manually adjustable flow control valves (58),(59) are provided in the pneumatic system (16), mounted on the reservoir (49), with one valve (58) interconnected in the schematic air line (61) (FIG. 3) to the spray or misting nozzle (47) for adjusting the pressure with which the mist is delivered to the welding nozzle outlet end (62) (FIG. 5), and with the other valve (59) interconnected in the schematic line (63) (FIG. 3) leading from the reservoir (49) to the nozzle (47) for controlling the amount of anti-spatter compound delivered through the nozzle (47) to the welding nozzle outlet end (62). The spray pattern itself (see FIG. 5) is adjustable by a choke device (64) rotatably mounted on the nozzle (47).

In operation, the apparatus (10) can be mounted by either drilling holes in the back plate (66) of the housing (13) or by welding the back plate (66) to a support structure. Further, the apparatus (10) can be bench-supported on a floor-mounted support (not shown). In general, the apparatus (10) should be positioned such that the welding nozzle (14) can handily approach the hammer device striker (18) and valve cam operator (37) (FIG. 4) for cleaning purposes, and the spray nozzle (47) and its valve cam operator (38) (FIG. 5) for spraying anti-spatter compound thereon, all without interference.

The optimum hammer striker (18) frequency depends upon the type, size and rigidity of the welding nozzle (14) being cleaned, as well as the air line supply pressure at (21). The intention is to cause the maximum vibration of the nozzle (14) which doesn't necessarily require full air flow to the striker (18). Manually activate the hammer valve unit (11) and, using a small screw driver, adjust the flow control valve (43) from zero flow to full flow to determine the range of strike frequency. Preset the frequency close to mid-range of the strike frequency.

Bring the nozzle (14) into position engaging the hammer valve cam (37) and angled such that the nozzle tip (62) is within the reach of the striker (18). The nozzle (14) should not be "pushing" the striker (18) into the hammer (17), but should allow the striker (18) free movement of about ¼ inch. The operator should put his/her finger on the back side of the nozzle (14) opposite the striker (18). If the nozzle (14) vibrates violently (hard to maintain the finger on the nozzle (14), decrease the strike frequency with the flow control (43) until the vibration becomes more subdued, then increase the strike frequency just until the vibration becomes more violent. If the nozzle (14) vibrates softly, increase the strike frequency until one has to apply a small amount of pressure to maintain the finger's contact with the nozzle (14). This is the most effective frequency to dislodge matter (67) inside the nozzle tip (62) (FIG. 4).

The three adjustments involving the air flow control valve (58), the lube (compound) flow control valve (59) and the spray nozzle choke (64) have been described hereinbefore. These adjustments should be set to deliver a burst of mist upon actuation which will deliver enough compound to produce a film on a dry nozzle (14) within 2–3 seconds. This will require the air and lube controls (58),(59) to be nearly full open. The lube flow (59) should be throttled back to individual preferences of film thickness. The choke (64) should be set to permit dispersal which envelopes the nozzle (14), creating a film of anti-spatter compound on both the outside and inside of the welding nozzle (14), but not releasing a large amount to open atmosphere.

Obviously, many modifications and variations of the present invention are possible in light of the above teachings. It is therefore to be understood that, within the scope of the appended claims, the invention may be practiced otherwise than as specifically described.

We claim:

1. Apparatus to prevent the formation of welding material about a welding nozzle outlet end comprising:
   a pneumatic system for supplying fluid under pressure;
   a first valve means fluidly connected within said pneumatic system;
   reciprocal hammer means operable in response to the application of fluid pressure thereto, said reciprocal hammer means fluidly connected with said first valve means for receiving fluid pressure upon activation of said first valve means;

said first valve means activated upon contact by engagement therewith of the welding nozzle, whereby said hammer means is operable to repeatedly strike the welding nozzle thereby dislodging any material build-up thereon.

2. The apparatus of claim 1, and further wherein said first valve means includes a limit-operated valve engageable by the welding nozzle.

3. The apparatus of claim 2, and further wherein said pneumatic system includes a flow control valve operable to adjustably control the striking frequency of said hammer means.

4. The apparatus of claim 2, and further comprising spraying means connected in said pneumatic system, said spraying means comprising second valve means activated upon contact therewith of the welding nozzle, and comprising further a spray nozzle external the welding nozzle and fluid connected to said second valve means and operable in response to activation of said second valve means to spray an anti-spatter compound toward the outlet end of the welding nozzle;

and further comprising a reservoir containing an anti-spatter compound fluid connected in said pneumatic system, and wherein said spray nozzle is a siphon-type fluid connected to simultaneously receive separate sources of air under pressure from said pneumatic system and from said reservoir, said reservoir air under pressure carrying the anti-welding spatter compound, a misting-type spray of air and anti-spatter compound thereby emanating under a predetermined pressure from said spray nozzle.

5. The apparatus of claim 4, and further with said pneumatic system including an air flow control device fluidly connected therein and adjustable to control the pressure with which the spray is delivered and a fluid flow control device fluidly connected in said pneumatic system and adjustable to control the amount of compound siphoned from said reservoir and contained within the spray.

6. The apparatus of claim 5, and further wherein a choke element is mounted on said spray nozzle to provide manual adjustment of the pattern of spray delivered.

* * * * *